United States Patent Office 3,073,828
Patented Jan. 15, 1963

3,073,828
DIACYL DERIVATIVES OF CORYNANTHINE HAVING DIFFERENT ACYL SUBSTITUENTS
Mario Reiser and Emil A. Eidebenz, Wiesbaden-Biebrich, and Heinz Georg von Schuh, Weisbaden, Germany, assignors to Chemische Werke Albert, Weisbaden-Biebrich, Germany, a corporation of Germany
No Drawing. Filed Oct. 20, 1960, Ser. No. 63,713
Claims priority, application Germany Oct. 19, 1957
6 Claims. (Cl. 260—287)

This invention relates to diacyl derivatives of corynanthine having different acyl substituents.

This application is a continuation-in-part of our copending application Serial No. 766,726, filed October 13, 1958, now abandoned.

The preparation of O,N-diacetyl corynanthine by the introduction of acetyl groups into the 1- and 17-positions is disclosed in Bull. Soc. Chim., T.10, 383–385, 1943.

In our copending application, Serial No. 766,725, filed October 13, 1958, now Patent No. 2,975,183, we have disclosed new higher molecular diacyl derivatives of corynanthine which are strikingly superior to corynanthine and its known diacetyl derivatives. These new and superior compounds are produced by acylating corynanthine, or its hydrohalide, with molar excesses of compounds which introduce the same higher molecular aliphatic acyl radicals onto the O and N atoms.

Now it has been found that compounds which possess properties which are significantly and surprisingly superior to those of the above noted prior art compounds, and to those of our copending application can be obtained if the corynanthine, or its hydrohalide, are respectively acylated in their 1- and 17-positions with different monocarboxylic acids, one of which is an aliphatic carboxylic acid and the other is an aryl carboxylic acid. The acylating radicals may be visualized as those corresponding to the acyl radical of a monovalent carboxylic acid having the formula RCOOH wherein R is an aliphatic, and aryl or an aralkyl radical.

Basically, the compounds of this invention are prepared by known acylating methods although certain acylating methods have definite advantages. Also, the order in which the two different acyl groups are introduced is important. They are prepared by first acylating the corynanthine, or its hydrohalide, at its 17-position (OH), by generally known methods, with known acylating compounds. If desirable, or necessary, the acylation takes place in the presence of a diluent. In accordance with an important embodiment of the invention, acylation in the 17-position takes place by reacting the corynanthine, or its hydrogen halide, advantageously its hydrochloride, under heating with an acid halide, typically an acid chloride having the formula RCOX wherein R is a monocyclic carbocyclic aryl radical and X stands for a halogen. The O-ester salt may be used as such in the next step of the process, or it may be converted into a free base with an alkali.

After the O-ester of corynanthine is obtained, it is further acylated in a like manner in the 1-position (N) with an aliphatic carboxylic halide in the presence of the corresponding acid which is usually present in an amount approximately equalling that of the acid halide or an aliphatic acid anhydride in the presence of an alkali metal salt, typically a sodium salt, of the corresponding acid, to thereby form the diacyl derivative of corynanthine containing different acyl radicals in the 1- and 17-positions. In an especially important embodiment of the invention, the acylating radical for the $N^1$ position has the formula RCO wherein R is an alkyl radical. Especially desirable compounds are obtained when the R of the acylating radical on the N atom forming the amide is alkyl, preferably a low molecular alkyl, and the R of the acylating radical forming the ester is aryl and, more particularly, aralkyl. Typically basically aryl acylating radicals include benzoyl, methoxybenzoyl, methylbenzoyl, phenacetyl and acyl radicals of like monocyclic carbocyclic alkylaryl and aralkyl carboxylic acids.

The corynanthine derivatives obtained in accordance with this invention possess sympathicolytic properties and show therapeutic effects which are surprisingly and significantly superior to, and at times different from, the therapeutic effects produced by the starting material, the corynanthine, and the already known O,N-diacetyl corynanthine. While the O,N-diacetyl corynanthine shows an increase in toxicity as compared to the corynanthine, the novel compounds of this invention and of our copending application show simultaneously with their higher activity a lower toxicity. For instance, the O,N-dipropionyl corynanthine of our copending application shows a potency which is more than six times higher than that of the corynanthine and about twice as much as that of the O,N-diacetyl corynanthine, while it shows a toxicity which is only slightly more than that of the corynanthine and substantially less than that of the O,N-diacetyl compound. On the other hand, recognized tests show that the N-acetyl-O-phenylacetyl corynanthines of this invention have an activity which is three times as great as that of O,N-dipropionyl corynanthine and a toxicity which is only about one-third as great.

One manner of testing the sympathicolytic potency of the diacylates of this invention, as compared to that of corynanthine and its known diacetyl derivative, is to measure the time lapse from the beginning to the end of blood pressure reversion after their administration resulting from the subsequent periodic administration of adrenalin.

Preliminary tests indicate that the diacylates of this invention may be used for diagnostic purposes.

Also, the diacyl derivatives of this invention, having the different acyl radicals in the 1- and 17-positions may be used for purposes for which the diacetylates of the prior art are unacceptable.

The following illustrative examples will serve to facilitate an understanding of the invention.

*Example 1*

A mixture of 10 g. O-benzoylcorynanthine hydrochloride (prepared from corynanthine hydrochloride and benzoic acid chloride; for instance, as shown below), 150 ml. acetic acid anhydride and 10 g. sodium acetate is heated under reflux for 10 hours. After evaporation, the reaction product is taken up in chloroform and extracted with a sodium carbonate solution. The chloroform extract is filtered, evaporated to dryness and again dissolved in 50 ml. of isopropanol. The bromohydrate of the N-acetyl-O-benzoylcorynanthine is precipitated with a solution of 3 g. pyridine-hydrobromide in isopropanol. After purification with isopropanol and acetone, 7 g. of a substance decomposing at 240° C. was obtained. The free base, melting at 179–181° C. can be precipitated from the alcoholic solution with an excess of an aqueous sodium acetate solution.

*Example 2*

Five (5) g. corynanthine hydrochloride and 10 g. benzoyl chloride are heated for 2 hours at 100° C., filtered, and after cooling, washed with acetone. A yield of 5.7 g. of the benzoyl corynanthine hydrochloride is obtained which melts with foaming at 265° C. The free base obtained by precipitation with ammonium hydroxide melts at 135° C., losing water, and can be used directly for the preparation of the N-acetyl-O-benzoyl corynanthine. A mixture of 3 g. O-benzoyl corynanthine, 20 ml. glacial acetic acid and 20 ml. acetyl chloride is boiled under reflux for 5 hours. The residue obtained after evaporation is recrystallized from isopropanol. A yield of 2 g. N-acetyl-O-benzoyl corynanthine hydrochloride is obtained having a decomposition point of 237–239° C. The free base having a melting point of 179–181° C. is obtained by precipitation with ammonium hydroxide.

*Example 3*

Six and five-tenths (6.5) g. benzoyl corynanthine are dissolved in 30 ml. hot propionic acid and then 30 ml. propionyl chloride is added to the solution drop by drop at 100° C. After heating for 5 hours, the mixture is evaporated to dryness. The residue is a syrup which quickly crystallizes. After washing the residue with acetone, 5.5 g. N-propionyl-O-benzoyl corynanthine hydrochloride are obtained, which decompose at 233–234° C. after recrystallization from isopropanol. The free base, melting at 208–210° C., is obtained with ammonium hydroxide.

*Example 4*

Ten (10) g. corynanthine hydrochloride are dehydrated by distillation with 80 ml. ethylene chloride and 10 g. phenylacetic acid chloride are added to the residue and heated for ¾ hour at 100° C. The mixture is cooled and filtered and 11.5 g. of O-phenylacetyl corynanthine hydrochloride, decomposing at 270–272° C. are obtained. The corresponding free base is obtained by treating this intermediate with an alkali such as an alkali metal carbonate or ammonium hydroxide. A mixture of 10 g. phenylacetyl corynanthine hydrochloride, 80 mg. glacial acetic acid and 80 ml. acetyl chloride is boiled under reflux until the solution clears up. After evaporation until the product is dry, it is taken up with chloroform and extracted with sodium bicarbonate solution. After evaporation of the chloroform and taking up in isopropanol, 6.6 g. O-phenyl-acetyl-N-acetyl corynanthine are obtained. After dissolving in alcohol and crystallizing, the substance melts at 172–174° C.

*Example 5*

Five (5) g. corynanthine are heated for one hour at 100° C. with 10 g. p-methoxy-benzoyl chloride and 5 ml. toluene. The still warm crystals are stirred with methanol, filtered, and washed with methanol and acetone. Five and five-tenths (5.5) of O-p-methoxy-benzoyl corynanthine hydrochloride, having a decomposition point of 251–253° C., are obtained. The free base, which can be obtained with ammonium hydroxide, decomposes between 137 and 142° C. A mixture of 5.5 g. O-p-methoxy-benzoyl corynanthine hydrochloride, 30 ml, glacial acetic acid and 15 ml. acetyl chloride is heated for 10½ hours under reflux. The resulting mixture is then heated and evaporated to dryness and thereafter heated with 70 ml. benzene resulting in the crystallization of N-acetyl-O-(p-methoxy-benzoyl) corynanthine hydrochloride. After recrystallizing the reaction product twice from alcohol, 3 g. N-acetyl-O-(p-methoxy-benzoyl) corynanthine hydrochloride are obtained having a decomposition point of 229–231° C. The free base has the melting point of 139–141° C.

By substituting p-methylbenzoyl chloride for p-methoxybenzoyl chloride in this example, the corresponding N-acetyl-O-(p-methyl-benzoyl) corynanthine hydrochloride is obtained.

*Example 6*

A mixture of 3.3 g. O-acetyl corynanthine (prepared from corynanthine and acetic anhydride in dioxane), 20 ml. propionic acid, and 20 ml. propionyl chloride is heated for 3 hours at 100° C. After evaporation of the reaction mass to dryness, it is taken up in benzene and warmed up whereby crystallization occurs. The crystalline substance is dissolved in isopropanol, and the resulting N-propionyl-O-acetyl corynanthine precipitates as a free base on addition of a few drops of ammonium hydroxide. After recrystallization from isopropanol, 1 g. of the free base is obtained which melts at 131–133° C. without decomposition.

It will be apparent that other organic or inorganic salts can be derived from the free bases disclosed in any of the preceding examples. Those derived from organic and inorganic acids having a disociation constant of at least $1.0 \cdot 10^{-3}$ have proven especially interesting. In the following four examples the derivation of certain salts of N-acetyl-O-phenacetyl-corynanthine are shown for illustrative purposes.

*Example 7*

Five (5) g. of N-acetyl-O-phenacetyl-corynanthine were dissolved cold in 30 cc. of glacial acetic acid. To this were added 2.5 g. of pyridine hydrobromide which was crushed well so that it is quickly dissolved. Crystallization began upon forming a paste. After a few hours any residual liquid was drained off and the product was washed with a little glacial acetic acid. Without drying, the crystalline mass was reduced to a slime in 20 cc. acetone. After adding 20 cc. of water a clear solution formed, by the further addition of 100 cc. of water the N-acetyl-O-phenacetyl-corynanthine hydrobromide was precipitated. After draining off and washing with water, 3.5 g. of the hydrobromide was obtained with a decomposition point of 145–155° C. From the filtrate, after concentration, still another 1 g. of the hydrobromide can be obtained.

*Example 8*

Five (5) g. of N-acetyl-O-phenacetyl-corynanthine and 2 g. of tartaric acid were dissolved together in 30 cc. of methanol. Then 30 cc. of water was added and crystals formed. After completion of the crystallization, residual liquid was drained off and the product was washed with a mixture of methanol and water 1:1. As a result, 4 g. of N-acetyl-O-phenacetyl-corynanthine tartrate was obtained with a decomposition point of 175–177° C.

*Example 9*

Five (5) g. of N-acetyl-O-phenacetyl-corynanthine were suspended in 20 cc. of methanol. After the addition of 2 g. of maleic acid, a solution was formed. Immediately afterwards the salt began to precipitate. Upon draining off and washing with a little methanol, 5 g. of N-acetyl-O-phenacetyl-corynanthine maleate was obtained with a decomposition point of 198–200° C.

*Example 10*

Two (2) g. of salicylic acid were dissolved cold in 20 cc. of methanol. To this were added 5 g. of N-acetyl-O-phenacetyl-corynanthine. Crystallization took place in a short time. Excess liquid was drained off and the product was washed with methanol. Six and five-tenths (6.5) of N-acetyl-O-phenacetyl-corynanthine salicylate was obtained with a decomposition point of 202–205° C.

The preceding examples have disclosed processes for introducing into corynanthine two different acyl radicals of the formula RCO where the R of the acyl radical substituted on the N atom is a low molecular alkyl radical and the R of the ester forming acyl radical is an alkyl, an aralkyl, an alkaryl or an aryl radical. It will be understood, however, that these examples are merely illustrative and that the procedures described therein can be used to produce diacylates of corynanthine containing other aliphatic, aryl, alkaryl and aralkyl radicals in their acyl radicals and that these processes, or modifications thereof, can be used to produce diacylates of corynanthine containing a great variety of acyl radicals. It will be observed further that the organic and inorganic acids used in forming the salts of the diacyl derivatives of corynanthine disclosed in the specific examples possess a disociation constant of $1.0 \cdot 10^{-3}$ and that they all function to form acid addition salts of the free bases and that the acyl derivatives substituted in the 17-position constitute radicals which are dominantly aracyl radicals even though other substituent groups may be present in the acyl radical.

It will be apparent to those skilled in the art that embodiments of the invention, other than those described in the examples for illustrate purposes, may be evolved and that modifications in the illustrative embodiments may be made without departing from the spirit and scope of the invention as expressed above and as defined in the appended claims.

What is claimed is:

1. A compound selected from the group consisting of corynanthine esterified in $C^{17}$-position and acylated in $N^1$-position and its pharmacologically acceptable acid addition salts wherein the esterifying acyl radical has the formula R—CO— in which R is selected from the group consisting of phenyl, methoxyphenyl, methylphenyl and phenyl lower alkyl and wherein the acyl radical attached to the nitrogen atom has the formula R'—CO— in which R' is lower alkyl.

2. A compound as claimed in claim 1, wherein R—CO is the phenylacetyl radical.

3. A compound selected from the group consisting of N-acetyl-O-benzoyl corynanthine and its pharmaceutically acceptable acid addition salts.

4. A compound selected from the group consisting of N-propionyl-O-benzoyl corynanthine and its pharmaceutically acceptable acid addition salts.

5. A compound selected from the group consisting of N-acetyl-O-phenylacetyl corynanthine and its pharmaceutically acceptable acid addition salts.

6. A compound selected from the group consisting of N-acetyl-O- (p-methoxy-benzoyl) corynanthine and its pharmaceutically acceptable acid addition salts.

References Cited in the file of this patent

Janot et al.: Bull. Soc. Chim. Fr., volume 10 (1943), pages 383–385.

Migrdichian: Organic Synthesis, volume I, Reinhold, New York (1957), pages 368, 369, 319 and 320.